(12) United States Patent
McAvoy

(10) Patent No.: US 7,405,542 B1
(45) Date of Patent: Jul. 29, 2008

(54) GENERATOR SYNCHRONIZATION METHOD ON A COMMON DRIVE SOURCE AND APPARATUS THEREFOR

(75) Inventor: Michael B. McAvoy, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 11/613,673

(22) Filed: Dec. 20, 2006

(51) Int. Cl.
  *H02P 9/04* (2006.01)
(52) U.S. Cl. ............................... 322/14; 322/22; 322/20
(58) Field of Classification Search .................... 322/10, 322/14, 20, 22
  See application file for complete search history.

(56) References Cited

U.S. PATENT DOCUMENTS

| | | | |
|---|---|---|---|
| 4,829,228 A * | 5/1989 | Buetemeister | 322/27 |
| 5,592,909 A | 1/1997 | Tsuruta | |
| 5,739,676 A * | 4/1998 | Judge et al. | 322/22 |
| 5,973,481 A * | 10/1999 | Thompson et al. | 322/7 |
| 6,281,664 B1 * | 8/2001 | Nakamura et al. | 322/22 |
| 6,657,416 B2 * | 12/2003 | Kern et al. | 322/29 |
| 7,227,338 B2 * | 6/2007 | Lando | 322/14 |

\* cited by examiner

*Primary Examiner*—Nicholas Ponomarenko
(74) *Attorney, Agent, or Firm*—McNees Wallace & Nurick, LLC (57) ABSTRACT

A system that selectively alters a phase angle of an electrical generator. The system has a powered input shaft for transmitting power and an output shaft for receiving power for delivery to the electrical generator. A coupler portion interconnects the input shaft with the output shaft and transmits power therebetween. The coupler portion is selectively moveable in an axial direction between a first axial position wherein the input shaft and output shaft are disposed at a first relative angular position, and a second axial position wherein the input shaft and output shaft are disposed at a second relative angular position different than the first position.

20 Claims, 4 Drawing Sheets

GENERATOR SYNCHRONIZATION METHOD ON A COMMON DRIVE SOURCE AND APPARATUS THEREFOR

FIELD OF THE INVENTION

The present invention is directed to a method of synchronizing generators mechanically, and more specifically, to a method and system for controlling an angular phase shift between two electrically paralleled generators mounted to a common drive source, and includes a means to detect a phase error between two paralleled generators, and to control an actuator to reduce the error to within predetermined limits.

BACKGROUND OF THE INVENTION

As airplane architecture is increasingly dependent upon electrical systems to operate the aircraft, the size and criticality of the primary electrical generation systems also increases. As an example, the Boeing 787 employs two engines to drive four variable frequency starter/generators (VFSGs). In this arrangement, two starter/generators are mounted to each engine gearbox. Both of the generators do operate at the same speed and frequency, since they are directly geared from the same engine shaft, but the AC power output of the two generators is not synchronized in phase. Therefore, the power generated by the two generators cannot be tied directly together. In order to protect each generator, the distribution buses and related equipment connected to each generator must be physically separated. Additional bus tie breakers must also be installed to power each bus while the normal generator is not available. Such physical limitations increase the complexity, size, weight, and cost of the power distribution system.

Connecting two or more generators in parallel to a common bus could reduce this complexity and enable improved load balancing, but requires precise synchronization of both generators. If the generators are not precisely synchronized, large currents known as "circular currents" will be present, causing a loss in efficiency, excessive heat dissipation, and the potential to damage the generators. Typical six-pole generators should be mechanically aligned within approximately one degree. Known methods, such as indexing gears and keying shafts, could be applied, but these methods alone would not provide sufficient tolerances to allow the generators to be paralleled.

Additionally, many former airplane designs employed a Constant Speed Drive (CSD) mechanism to produce fixed 400 Hz power from a variable engine shaft speed. CSD mechanisms have been used, notably on the Boeing 747-400 airliner, to synchronize the main generators so that paralleled buses are feasible. However, CSD systems are heavy, expensive, and unreliable, and have been dropped in favor of directly geared variable frequency generators.

In designing new generations of aircraft, reducing the volume and weight of the power systems is critical. The four-bus architecture currently used in aircraft power distribution systems consumes an excessive amount of the equipment bay.

Therefore, what is needed is the ability to reduce the physical barriers and number of bus breakers required to operate the electrical systems of an aircraft, by configure the four generators that are required to power the aircraft in a two-bus architecture. Such an arrangement simplifies the electrical panels, reduces the amount of electrical equipment that is required, and relaxes the separation requirements internal to the panels as well as for wiring routed throughout the aircraft.

SUMMARY OF THE INVENTION

The present invention is directed to a method and apparatus for detecting and controlling the phase angle between a pair of generators synchronized on a common bus. The present invention is further directed to a system for controlling the phasing of multiple generators driven from a common drive source.

In one aspect, the present invention is directed to an aircraft electrical power system. The system includes one or more pairs of starter/generators having parallel outputs configured to power a common electrical bus. A power transmission device is provided, having a pair of rotary output elements and an input element. A rotary drive source drives the input of the power transmission device. At least one adjustable coupler mechanism is controllable to adjust a phase angle of a rotor shaft of the at least one starter/generator. The starter/generators include one coupler mechanism each, to couple the rotor shaft of the starter/generator to one of the rotary output elements. A controller is configured to monitor an output electrical phase angle of each starter/generator and control the coupler mechanism in response to a detected phase error between the respective starter/generator output electrical phase angles by adjusting a relative angular position between one of the rotor shafts and the coupled rotary output element such that the phase error is substantially eliminated.

In another aspect, the present invention is directed to a synchronization system for synchronizing a plurality of starter/generators on an engine, and connected in parallel on a common bus. The system includes a primary rotary drive shaft drivingly connected to the engine. A power transmission device has an input and a plurality of output drive shafts. The power transmission device is driven by the primary rotary drive shaft and is configured to power the plurality of starter/generators at a predetermined rotational frequency. At least one coupler mechanism is connected between an input shaft of one of the starter/generators and one of the output drive shafts of the power transmission device. A controller monitors an output electrical phase angle of the starter/generators and controls the coupler mechanism in response to a predetermined deviation between the respective starter/generator electrical output phase angles. The coupler mechanism is selectively moveable to adjust a relative angular position of the input shaft relative to the associated output shaft. Also, the output electrical phase of the starter/generator with which the coupler portion is coupled is adjustable in response to movement of the coupler mechanism, to substantially synchronize the output electrical phase of one of the starter/generators with the output electrical phase of the other starter/generators.

In another aspect, the present invention is directed to a method of synchronizing a pair of electrical generators for connection to a common electrical bus. The method includes the steps of driving a rotor shaft of each generator from a common drive source; providing a transmission device between each generator and the common drive source; coupling the rotor shaft of at least one generator to an input shaft of the transmission device with a coupler device, the coupler device being selectively moveable to adjust a relative angular position between the rotor shaft and the input shaft; sensing a phase difference between each electrical generator output current; determining whether circulating currents are present based on a sensed phase difference between the generator output currents; and, in response to a sensed phase difference, moving the coupler axially to a second position between the rotor shaft and the input shaft until the sensed phase difference is substantially eliminated.

An advantage of the present invention is the means to control the angular phase shift of the electrical outputs between two generators that are driven from a common drive source.

Another advantage of the present invention is that by controlling the angular phase shift of the generator output, the two generators may be electrically connected on a common bus, saving space and weight in the power distribution system, and enabling load sharing, with a minimal impact to the generators.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
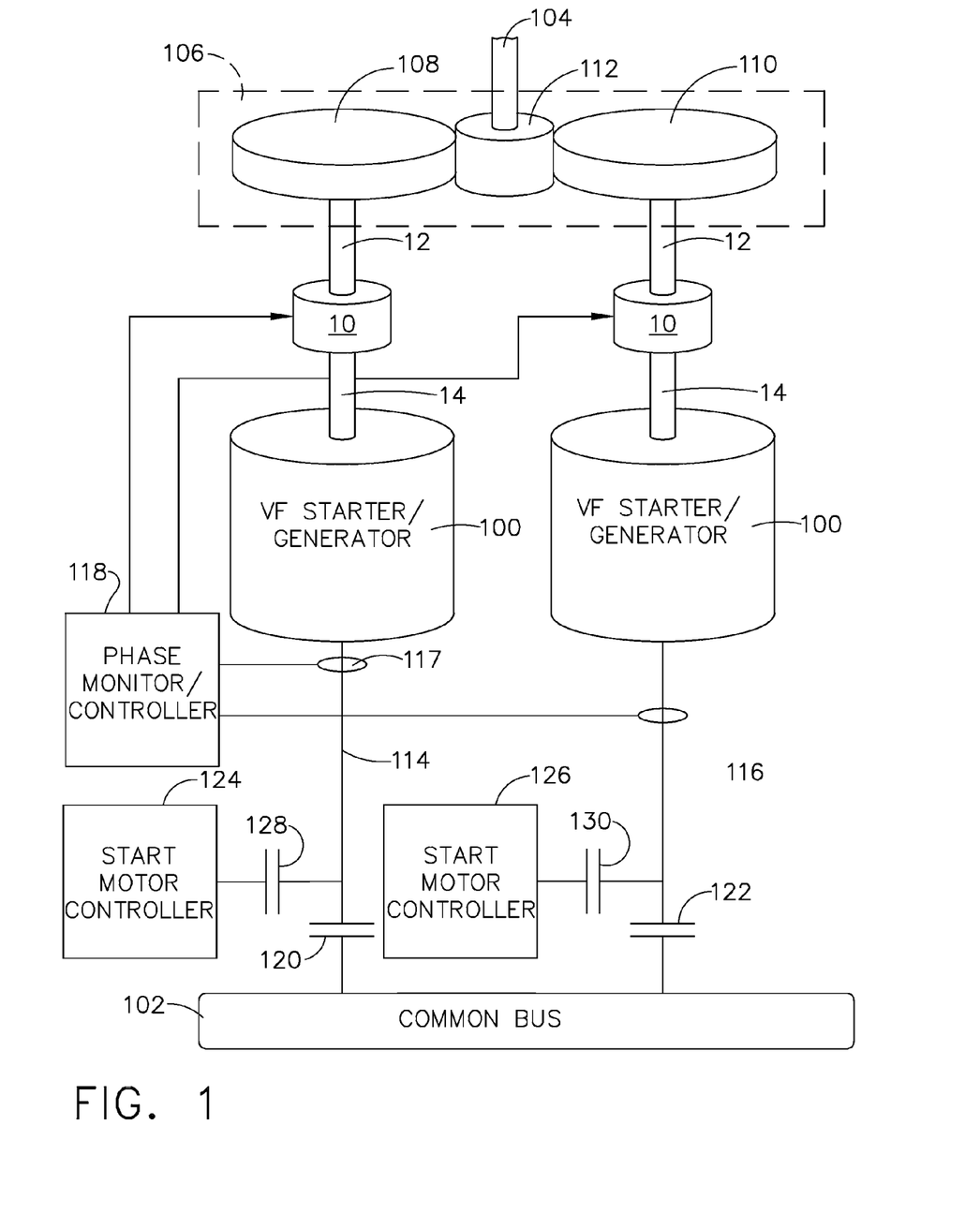
FIG. 1 is a schematic diagram of an exemplary synchronization arrangement for a pair of generators driven by a common shaft.

Referring to FIG. 1, an exemplary system of synchronously controlling a pair of variable frequency (VF) starter/generators 100 on a bus 102, is implemented using the synchronization mechanism 10 described below (See, e.g., FIGS. 2 & 3). VF starter/generators 100 have substantially identical electrical and mechanical ratings, e.g., input and output power, and are preferably identical or matching generator sets. A primary rotary shaft 104—e.g., a high-pressure (HP) spool or a low-pressure (LP) spool of a turbine engine—is drivingly connected to a gearbox 106. The shaft has an input or drive gear 112 meshing concurrently with and driving a pair of output gears 108 and 110. The output gears 108, 110 have the same gear ratio with the drive gear 112, causing the frequency of the VF starter generators 100 to be matched. The secondary gears 108, 110 have output shafts 12 inserted into the synchronization mechanism 10. It should be noted that the arrangement of the gearbox 106 is shown schematically, and that the gearbox may include multiple stages of gearing to achieve the desired rotational frequency of the VF starter/generators, as will be readily appreciated by persons having ordinary skill in the art. Other power transmission means may be substituted for the gearbox 106, such as a belt-driven pulley arrangement, a hydraulic transmission, multiple power take-offs, etc., provided that the drive means or prime mover is a single shaft and the power transmission means are configured to match the rotational speed and power of the starter/generators. Also, the system is operable as a generator or as a starter. When the system is operated as a motor for starting the turbine engine, the power train description is reversed, i.e., the primary rotary shaft 104 of the HP or LP spools is the output that is driven by VF starter/generators 100 through the secondary gears 108, 110 of the gearbox 106.

In the generator mode, the output shafts 12 of the gearbox 106 simultaneously drive a pair of rotor shafts 14 of VF starter generators 100. Each output shaft 12 is connected to the rotor shaft 14 through a synchronization mechanism 10. Each VF starter/generator 100 produces an electrical power output on lines 114, 116, respectively. Controller 118 senses the output phase currents for each generator 100, and compares the two as described above. The controller 118 adjusts the phase angle for each VF starter generator 100 until the phase angles match within predetermined tolerances. When the respective phase angles are matched within the predetermined tolerance, the VF starter generators 100 are connected to the common bus 102 via contactors 120 and 122, respectively. The contactors 120, 122 are actuated by controller 118. The controller 118 may optionally be configured to open either or both of the contactors 120, 122, if the VF starter generators 100 drift out of phase by a predetermined unacceptable tolerance during flight.

There is also a controller 124, 126 associated with each VF starter generator 100. The controllers 124, 126 are configured to connect either or both the VF starter generators 100 to an external electrical power source (not shown) for electrically starting the turbine engines. The external power source is connected through contactors 126, 128 to power lines 114, 116 respectively, to energize the VF starter generators 100, which in turn drive the HP spool or LP spool 104 through gearbox 106. Phase control may optionally be implemented during electrical starting of the engine. After a predetermined startup interval, the contactors 128 and 130 open to isolate the external power source or sources from the VF starter generator 100 outputs.

The above-described system is implemented in an aircraft wherein a pair of generators 100 are connected to each engine for powering electrical loads associated with the aircraft. In this way, segregation of power apparatus is not required, and the associated electrical distribution equipment is correspondingly in size. The synchronization system provides inherent load balancing between the commonly driven generator pairs.

Figure 2:
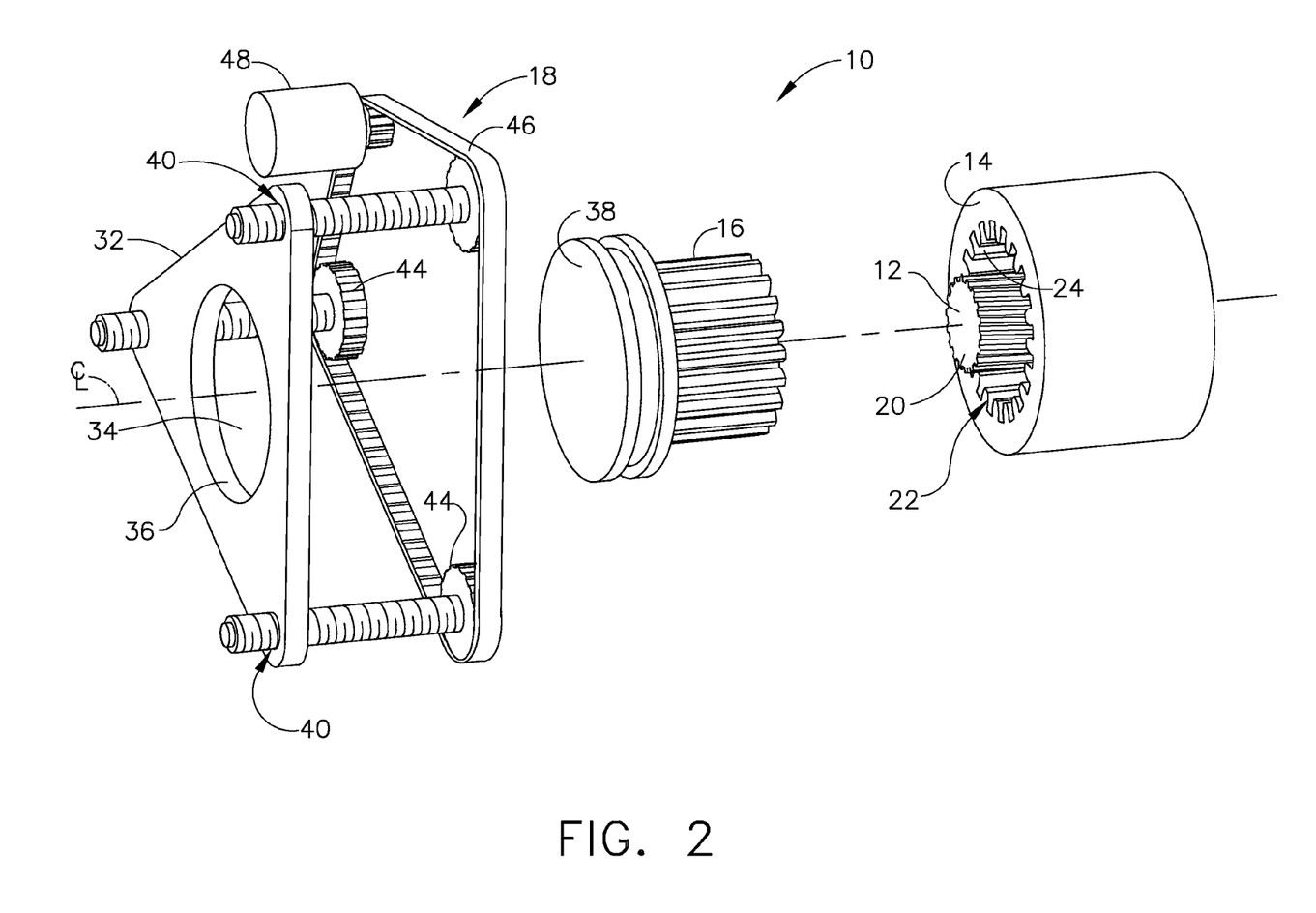
FIG. 2 is an exploded perspective view of the synchronization mechanism of the present invention.
Figure 3:
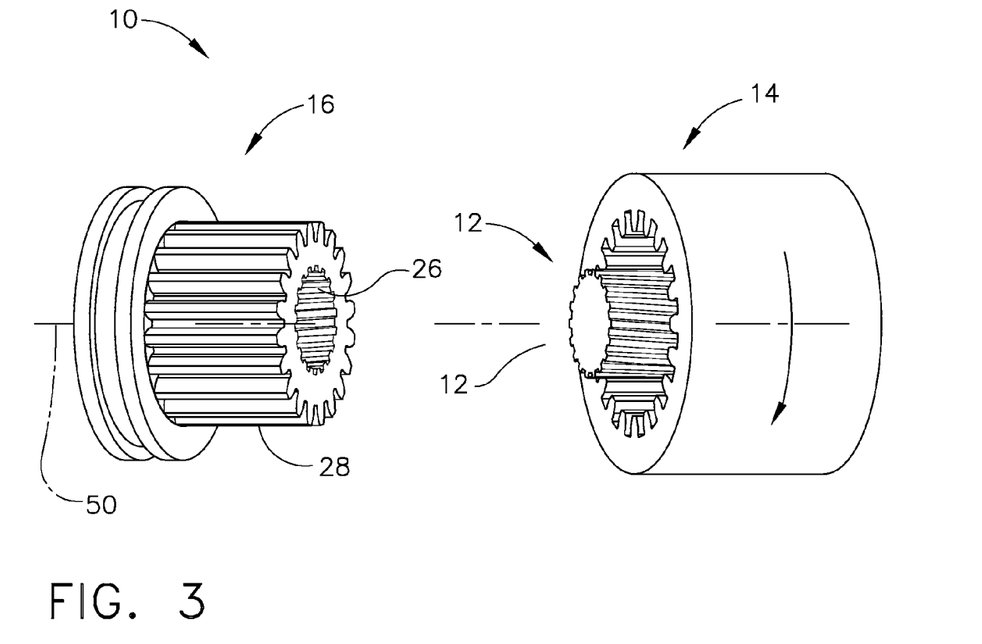
FIG. 3 is an exploded perspective view of the synchronization mechanism showing the actuator assembly, coupler and shaft arrangement.
Figure 4:
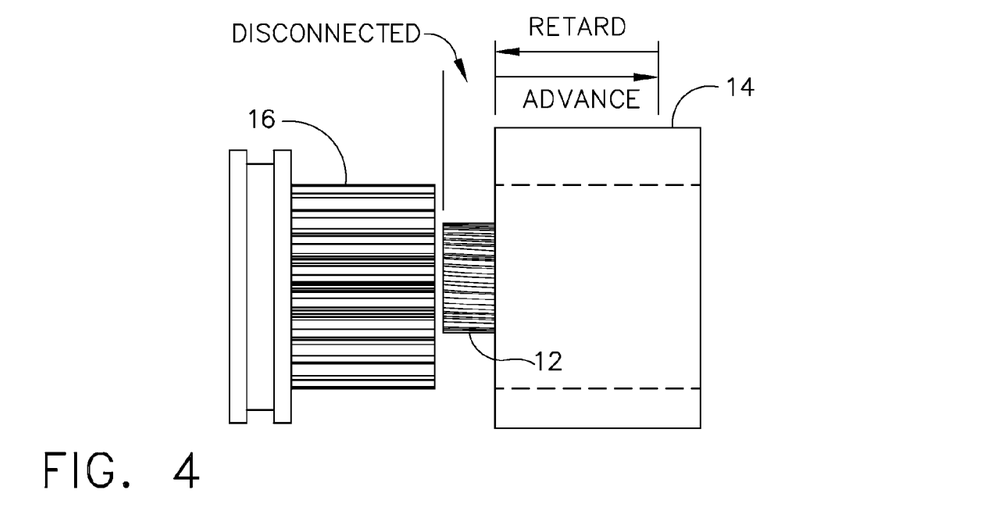
FIG. 4 shows a line diagram of the axial coupling and de-coupling distances.

Referring next to FIGS. 2-4, the present invention is directed to a synchronization mechanism generally designated as 10. The synchronization mechanism 10 can automatically advance or retard the phasing of one or two generators 100 by a few degrees, in order to synchronize two generators 100 operating in parallel. The range of adjustment must be adequate to cover the tolerances within the gearbox, but is expected to be approximately five degrees. Typically, the generators 100 are drivingly connected to a gear reducer through the synchronization mechanism. The synchronization mechanism 10 receives input shaft 12, which is typically the output shaft of a gear reducer, and is attached to a rotor shaft 14. A shaft coupler 16 joins the rotor shaft 14 and the input shaft 12, and an actuator 18 controls the axial position of the coupler 16. Current transformers or any other suitable current measuring sensor 117 are used to detect circular currents in the generator outputs, and a controller for controlling the relative phase of the two generators in response to a sensed circulating current.

In a preferred embodiment, the input shaft 12 from the gear reducer has helical splines 20 at one end. The helical splines 20 have a slight axial twist, and may be machined onto the generator shaft or threadably attached to a gearbox output shaft. The rotor shaft 14 has an annular open end 22 with internal splines 24. The internal splines 24 of the rotor shaft 16, and the external splines 28 of the coupler are preferably straight splines, however, the splines may also have a slightly helical configuration, e.g., to account for shaft twist. The coupler 16 has internal splines 26 and external splines 28 mating with the splines of the input shaft 12 and rotor shaft 14, to engage both of the input shaft 12 and the rotor shaft 14, to link them together. Other splined arrangements may be used as well, e.g., the rotor shaft 14 having internal helical splines 24, and the input shaft 12 having straight splines 20; or the rotor shaft 14 and the input shaft 12 having helical splines with opposite twists. In principle the splined arrangements between the input shaft 12 and the rotor shaft 14 need merely be variably aligned relative to one another, and complementary with the corresponding or mating splined arrangement on the coupler 16. Both the rotor shaft 14 and the input shaft 12 are keyed with the coupler 16 so that they engage only when the generator poles are nearly aligned.

As indicated above, the coupler splines 26, 28 mate with and link the rotor shaft 14 with the input shaft 12. Any axial movement of the coupler changes the angular position of the rotor shaft 14 relative to the input shaft 12. Preferably, the input shaft 12 extends slightly beyond the end of rotor shaft 14, so that by moving the coupler 16 axially beyond the end of the rotor shaft 16, the coupler 16 disengages from the rotor shaft 14, while still maintaining mechanical engagement with the input shaft 12, which mechanically disconnects the generator. This relationship is illustrated linearly in FIG. 4. At the left end limit of travel of the coupler 16, the coupler 16 and rotor shaft 14 are disconnected, while the coupler 16 is still engaged with the input shaft 12, due to the extension The actuator 18 is operable to drive the axial position of the coupler 16. The actuator may be any type of actuator for effecting linear movement of an object on a rotating shaft, e.g., hydraulic piston, magnetically actuated positioners, or other means. In the embodiment shown in FIGS. 2 and 3, axial movement of the coupler 16 is controlled by an actuator motor 30. A carrier plate 32 has an axial opening 34 with a coupler bearing 36 for receiving the coupler flange 38. The coupler flange is rotatable in the coupler bearing 36, and restrained from linear movement relative to the carrier 32. The carrier plate 32 has a plurality of threaded holes for receiving threaded posts 42. The threaded posts have toothed sprockets 44 attached at one end. An endless toothed belt 46 engages the toothed sprockets for rotating the toothed sprockets 44. Actuator motor 48 drives the toothed belt 46 in response to control signals generated by the controller in response to the sensed circulating currents which indicate a phase deviation between two generators connected in parallel. The actuator motor 48 positions the carrier plate 32 by advancing or retracting the threaded posts 44, which are rotated by the toothed belt 46, clockwise or counterclockwise as appropriate, to move the carrier plate in either direction linearly and coaxially with the coupler 16, and shafts 12, 14. As the axial position of the coupler 16 coincides with the position of the carrier plate 32, movement of the carrier plate 32 moves the coupler 16 linearly along the axis 50 of the shafts 12, 14, and mechanically adjusts the relative rotational angle between the shafts 12, 14, or disconnects the shafts 12, 14 if driven beyond the end of the rotor shaft 14.

Figure 5:
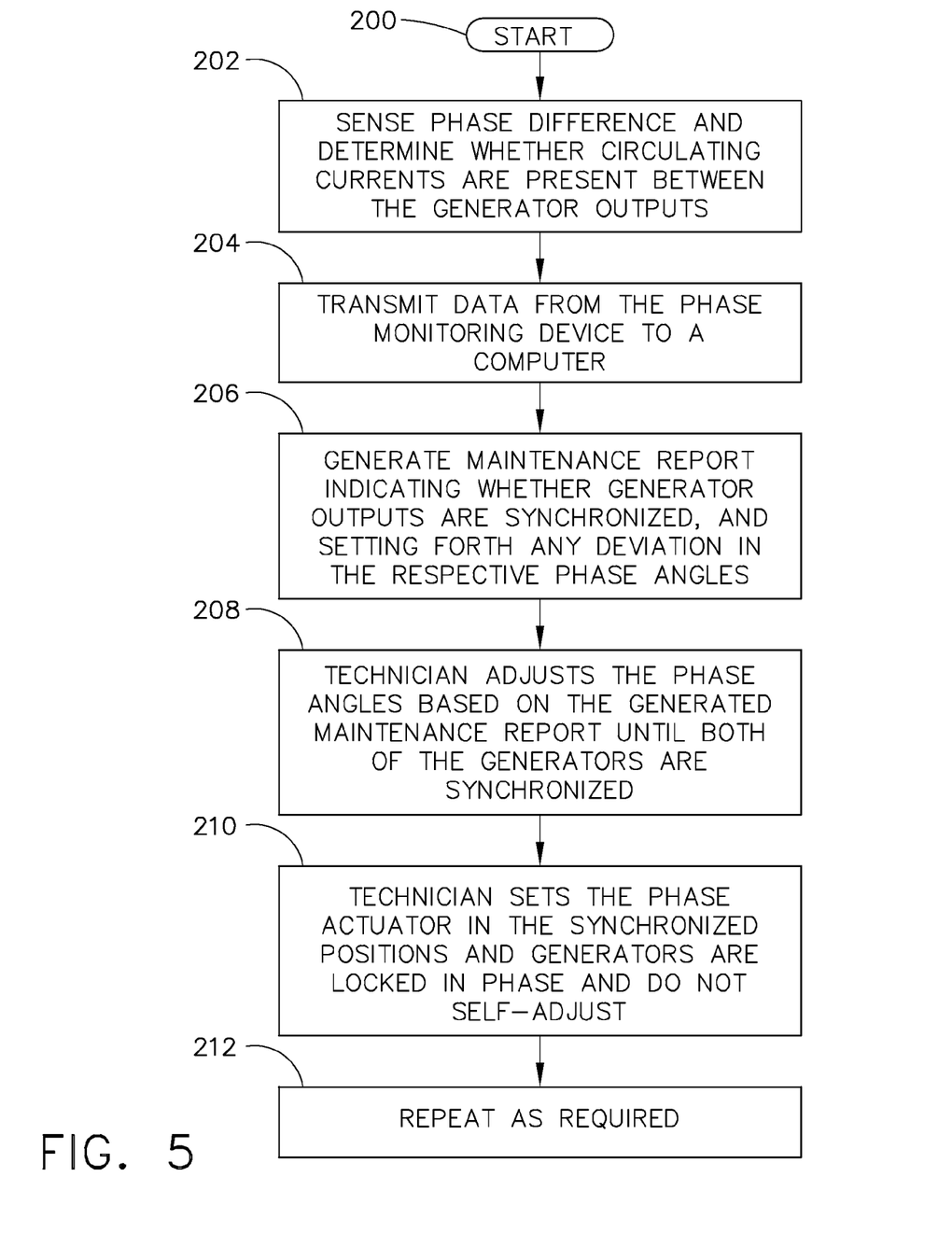
FIG. 5 is a method for synchronization of generators according to the present invention.

In another embodiment, the present invention may implement a synchronization system in an aircraft maintenance method as follows:

Referring to FIG. 5, in step 200, a pair of generators 100 is initialized by a first operation of the engine; the generators are configured to be driven by a common drive shaft 104 through a gearbox 106. In step 202, a phase difference is sensed by a phase monitoring device, to determine whether circulating currents are present between the respective generators; in step 204, data is then transmitted by the phase monitoring device to a digital computer (personal computer, programmable controller, laptop, etc.) through an appropriate interface; in step 206, the computer generates a maintenance report indicating whether the generator outputs are synchronized, and setting forth the deviation, if any, in the respective phase angles; then, in step 208, a technician adjusts the phase angles by operating the phase control actuator until both of the generators are synchronized; in step 210, the technician fixes the phase actuator in the synchronized positions, so that the generators are locked in phase and do not self-adjust; in step 212, the phase monitoring device detects and compares the generator outputs at predetermined intervals, e.g., after each flight or at every scheduled preventive maintenance shutdown; and in step 212, the method is repeated as necessary. The method of FIG. 5 may be implemented in instances where it is impractical or unnecessary to provide continuous feedback control of the synchronization mechanism 10.

Since the drive shaft that powers the gearbox 106 is common to both generators 100, the gear ratios of the gearbox 106 are the same, and the generators 100 are substantially identical, the frequency of the two generators is inherently the same. Therefore, the singular control parameter of the present invention is the phase angles of the outputs of the generators 100, to avoid circular currents and to achieve load balancing, between generators.

In another embodiment, the generator synchronization system may be controlled by a single synchronization mechanism 10, by sensing the phase angle of the first generator 100 as a reference signal, and modulating the output phase of the second generator 100 to synchronize the second generator phase angle with the first generator phase angle, substantially eliminating circulating currents.

It should also be understood that variations might be made to the synchronizing mechanism within the spirit and scope of the present invention. For example, the synchronization mechanism 10 may be disposed internally in the engine gearbox, by incorporating a sliding helical gear similar to the synchronization mechanism helical splines 20 to accomplish the adjustment. Furthermore, an alternate synchronization mechanism (not shown) may include gears with a herringbone arrangement, rather than with helical splines, to neutralize the effects of axial thrust.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electrical power system comprising:
    at least one pair of generators having parallel outputs configured to power a common electrical bus;
    a power transmission device having a pair of rotary output elements and an input element;
    a rotary drive source for driving the input of the power transmission;
    at least one adjustable coupler mechanism controllable to adjust a phase angle of a rotor shaft of the at least one generator; and
    a controller;

wherein the at least one generator includes one coupler mechanism to couple the rotor shaft of the generator to one of the rotary output elements; and the controller being configured to monitor an output electrical phase angle of each generator and control the at least one coupler mechanism in response to a detected phase error between the respective generator output electrical phase angles by adjusting a relative angular position between one of the rotor shafts and the coupled rotary output element such that the phase error is substantially eliminated.

2. The power system of claim 1, wherein the relative angular position is adjusted by an actuator configured to move the coupler mechanism axially to change the relative angular position between the rotor shaft and the coupled rotary output element.

3. The power system of claim 1, wherein also including an aircraft, the aircraft including a plurality of turbine engines, and wherein each turbine engine including an electrical power system.

4. The power system of claim 1, wherein each coupler mechanism comprises:
   an annular coupler portion having internal splines and external splines; and
   an actuator portion;
   the external coupler portion splines and internal splines of a first coupled shaft comprising a first pair of mateable splines; and the coupler portion internal splines and external splines of a second coupled shaft comprising a second pair of mateable splines; the first pair of mateable splines deviating linearly with respect to the second set of mateable splines;
   wherein the coupler mechanism is selectively moveable by the actuator portion along an axis between a first axial position, wherein the input shaft and output shaft are disposed at a first relative angular position, and a second axial position, wherein the input shaft and output shaft are disposed at a second relative angular position different than the first position, such that the output electrical phase of the generator with which the coupler portion is coupled is adjustable in response to movement of the coupler portion to substantially synchronize the output electrical phase of one of the generators with the output electrical phase of the other generators.

5. The power system of claim 1, wherein the generators are variable frequency starter/generators.

6. The power system of claim 1, wherein the power system is disposed on an aircraft and driven by an engine of the aircraft.

7. A synchronization system for synchronizing a plurality of generators connected in parallel on a common bus in an engine, the system comprising:
   a primary rotary drive shaft drivingly connected to the engine;
   a power transmission device having an input and a plurality of output drive shafts, the power transmission device being driven by the primary rotary drive shaft and configured to power the plurality of generators at a predetermined rotational frequency;
   at least one coupler mechanism connected between an input shaft of at least one of the generators and one of the output drive shafts of the power transmission device; and
   a controller for monitoring an output electrical phase angle of the generators and controlling the at least one coupler mechanism in response to a predetermined deviation between the respective generator electrical output phase angles;
   wherein the coupler mechanism is selectively moveable to adjust a relative angular position of the input shaft relative to the associated output shaft; and
   wherein the output electrical phase of the generator with which the coupler portion is coupled is adjustable in response to movement of the coupler mechanism to substantially synchronize the output electrical phase of one of the starter/generators with the output electrical phase of the other starter/generators.

8. The synchronization system of claim 7, wherein each coupler mechanism also includes:
   an annular coupler portion having internal splines and external splines; and
   an actuator portion;
   the external coupler portion splines and a plurality of internal splines of a first coupled shaft comprising a first pair of mateable splines; and the coupler portion internal splines and a plurality of external splines of a second coupled shaft comprising a second pair of mateable splines; the first pair of mateable splines having splines that vary linearly with respect to the second set of mateable splines;
   wherein the coupler mechanism is selectively moveable by the actuator portion along an axis between a first axial position, wherein the input shaft and output shaft are disposed at a first relative angular position, and a second axial position, wherein the input shaft and output shaft are disposed at a second relative angular position different than the first position, such that the output electrical phase of the generator with which the coupler portion is coupled is adjustable in response to movement of the coupler portion to substantially synchronize the output electrical phase of one of the generators with the output electrical phase of the other generators.

9. The system of claim 8, wherein the first pair of mateable splines being aligned parallel to the axis, and the second pair of mateable splines having splines that are curved with respect to the axis.

10. The system of claim 8, wherein the coupler portion internal splines having an axially helical twist relative to the coupler portion external splines.

11. The system of claim 8, wherein at least one of the coupler portion external splines and the coupler portion internal splines having an axially helical twist relative to the other.

12. The system of claim 11, wherein the coupler portion also having an actuator assembly, the actuator assembly operable to move the coupler portion in an axial direction to forcibly advance the coupler portion, the actuator assembly in electrical communication with a controller portion, the actuator assembly configured to adjust the position of the coupler portion in response to a control signal from the controller portion.

13. The system of claim 7, wherein the first coupled shaft extends slightly beyond the end of the second coupled shaft, such that moving the coupler portion axially beyond the end of the second coupled shaft disengages the coupler portion from the second coupled shaft, while still maintaining mechanical engagement with the first coupled shaft to mechanically disconnect the generator.

14. The system of claim 8, wherein the actuator portion includes an actuator motor, a plurality of posts threadably attached to an actuator plate, and an endless belt engageable with the plurality of posts to rotate the posts concurrently to advance or retract the actuator plate, to adjust the coupler portion between the first axial position and the second axial position.

15. The system of claim 7, wherein the system also includes a controller portion, the controller portion having a phase-sensing portion, the phase sensing portion in electrical communication with the controller for transmitting a sensor signal representing a current output of the generator, the controller configured to receive the sensed signal and compare the sensor signal with a second sensor signal from a second generator to determine a relative electrical phase angle of the respective generators, and to generate a control signal to the actuator motor for adjusting the relative electrical phase angle of the generators by axial movement of the coupler portion until the error signal is cancelled.

16. The system of claim 7, wherein the power transmission device is one of:
a gearbox, a belt and pulley arrangement; a hydraulic transmission;
and a plurality of power take-offs; and
the drive means or prime mover is a single shaft and the power transmission devise are configured to match the rotational speed and power of the generators.

17. The system of claim 7, wherein the generators are variable frequency starter/generators.

18. A method of synchronizing a pair of electrical generators for connection to a common electrical bus, comprising:
driving a rotor shaft of each generator from a common drive source;
providing a transmission device between each generator and the common drive source;
coupling the rotor shaft of at least one generator to an input shaft of the transmission device with a coupler device, the coupler device being selectively moveable to adjust a relative angular position between the rotor shaft and the input shaft;
sensing a phase difference between each electrical generator output current;
determining whether circulating currents are present based on a sensed phase difference between the generator output currents; and
in response to a sensed phase difference, moving the coupler axially to a second position between the rotor shaft and the input shaft until the sensed phase difference is substantially eliminated.

19. The method of claim 18, also comprising the steps of:
providing an actuator configured to automatically move the coupler axially in response to the sensed phase difference, wherein the actuator includes an actuator motor, a plurality of posts threadably attached to an actuator plate, and an endless belt engageable with the plurality of posts to rotate the posts concurrently to advance or retract the actuator plate, to adjust the coupler portion between the first axial position and the second axial position.

20. The method of claim 18, also comprising:
transmitting data indicating the phase difference in the output currents to a computer;
generating a maintenance report indicating whether generator outputs are synchronized based on the determined circulating currents;
setting forth any deviation in the respective phase angles in response to a sensed phase difference;
manually adjusting a phase angle for at least one of the generators based on the generated maintenance report until both of the generators are synchronized; and
setting the phase actuator in the synchronized positions such that the generators are locked in phase and do not self-adjust;
repeating the above steps at predetermined service intervals on an aircraft.

* * * * *

UNITED STATES PATENT AND TRADEMARK OFFICE
CERTIFICATE OF CORRECTION

PATENT NO. : 7,405,542 B1
APPLICATION NO. : 11/613673
DATED : July 29, 2008
INVENTOR(S) : Michael B. McAvoy It is certified that error appears in the above-identified patent and that said Letters Patent is hereby corrected as shown below:

Col. 1, Line 20: "the Boeing 787" should be --the aircraft--
Col. 1, Line 23: "generators" should be --starter/generators--
Col. 1, Line 26: "generators" should be --starter/generators--
Col. 1, Line 27: "generators" should be --starter/generators--
Col. 1, Line 28: "generator" should be --starter/generator--
Col. 1, Line 30: "generator" should be --starter/generator--
Col. 1, Line 32: "generator" should be --starter/generator--
Col. 1, Line 35: "generators" should be --starter/generators--
Col. 1, Line 37: "generators" should be --starter/generators--
Col. 1, Line 38: "generators" should be --starter/generators--
Col. 1, Line 41: "generators" should be--starter/generators--
Col. 1, Line 41: "generators" should be --starter/generators--
Col. 1, Line 45: "generators" should be --starter/generators--
Col. 1, Lines 50-51: delete ", notably on the Boeing 747-400 airliner."
Col. 1, Line 51: "generators" should be --starter/generators--
Col. 1, Line 52: "are feasible" should be --may be feasible--
Col. 1, Line 56: "generators" should be --starter/generators--
Col. 1, Line 62: "aircraft, by configure" should be --aircraft by configuring--
Col. 1, Line 63: "generators" should be --starter/generators--
Col. 2, Line 5: "generators" should be --starter/generators--
Col. 2, Line 7: "generators" should be --starter/generators--
Col. 2, Line 52: "generators" should be --starter/generators--
Col. 2, Line 54: "generator" should be --starter/generator--
Col. 2, Line 56: "generator" should be --starter/generator--
Col. 2, Line 61: "generator" should be --starter/generator--
Col. 2, Line 63: "generator" should be --starter/generator--
Col. 3, Line 3: "generators" should be --starter/generators--
Col. 3, Line 7: "generators" should be --starter/generators--
Col. 3, Line 10: "generators" should be --starter/generators--
Col. 3, Line 20: "generators" should be --starter/generators--
Col. 3, Line 42: "generator" should be --starter/generator--
Col. 3, Line 49: "starter generators" should be --starter/generators--
Col. 3, Lines 54-55: "starter/generators" should be --starter/generators 100--
Col. 3, Lines 61-62: "starter/generators" should be --starter/generators 100--
Col. 3, Line 62: "generator" should be --starter/generator 100--

UNITED STATES PATENT AND TRADEMARK OFFICE
CERTIFICATE OF CORRECTION

PATENT NO. : 7,405,542 B1
APPLICATION NO. : 11/613673
DATED : July 29, 2008
INVENTOR(S) : Michael B. McAvoy It is certified that error appears in the above-identified patent and that said Letters Patent is hereby corrected as shown below:

Col. 3, Line 63: "starter." should be --starter motor.--
Col. 4, Lines 2-3: "starter generators" should be --starter/generators--
Col. 4, Line 7: "generator 100" should be --starter/generator 100--
Col. 4, Line 9: "starter generator 100" should be --starter/generator 100--
Col. 4, Line 12: "starter generators 100" should be --starter/generators 100--
Col. 4, Line 16: "starter generators 100" should be --starter/generators 100--
Col. 4, Line 20: "starter generators 100" should be --starter/generators 100--
Col. 4, Line 21: "starter generators" should be --starter/generators--
Col. 4, Line 25: "starter generators" should be --starter/generators--
Col. 4, Line 30: "starter generator" should be --starter/generator--
Col. 4, Line 33: "generators 100 are" should be --starter/generators 100 may be--
Col. 4, Lines 38-39: "generator" should be --starter/generator 100--
Col. 4, Lines 43-44: "generators 100" should be --starter/generators 100--
Col. 4, Line 45: "generators 100" should be --starter/generators 100--
Col. 4, Line 48: "generators 100" should be --starter/generators 100--
Col. 4, Line 56: "generator" should be --starter/generator--
Col. 4, Line 57: "generators" should be --starter/generators 100--
Col. 4, Line 62: "generator" should be --starter/generator--
Col. 5, Line 14: "generator" should be --starter/generator--
Col. 5, Line 45: "generators" should be --starter/generators 100--
Col. 5, Line 60: "generators 100" should be --starter/generators 100--
Col. 5, Line 61: "generators" should be --starter/generators 100--
Col. 5, Line 65: "generators" should be --starter/generators 100--
Col. 6, Line 3: "generator" should be --starter/generator--
Col. 6, Line 6: "generators" should be --starter/generators 100--
Col. 6, Line 8: "generators" should be --starter/generators 100--
Col. 6, Line 10: "generator" should be --starter/generator--
Col. 6, Line 18: "generators 100" should be --starter/generators 100--
Col. 6, Line 19: "generators 100" should be --starter/generators 100--
Col. 6, Line 20: "generators" should be --starter/generators 100--
Col. 6, Lines 22-23: "generators 100" should be --starter/generators 100--
Col. 6, Line 24; "generators" should be --starter/generators 100--
Col. 6, Line 25: "generator" should be --starter/generator--
Col. 6, Line 27: "generator 100" should be --starter/generator 100--
Col. 6, Line 29: "generator 100" should be --starter/generator 100--

UNITED STATES PATENT AND TRADEMARK OFFICE
CERTIFICATE OF CORRECTION

PATENT NO.       : 7,405,542 B1
APPLICATION NO.  : 11/613673
DATED            : July 29, 2008
INVENTOR(S)      : Michael B. McAvoy It is certified that error appears in the above-identified patent and that said Letters Patent is hereby corrected as shown below:

Col. 6, Line 29: "generator 100" should be --starter/generator 100--
Col. 6, Line 29: "generator" should be --starter/generator 100--
Col. 6, Line 30: "generator" should be --starter/generator--
Col. 6, Line 57: "generators" should be --starter/generators--
Col. 6, Line 66: "generator" should be --starter/generator--
Col. 7, Line 1: "generator" should be --starter/generator--
Col. 7, Line 2: "generator" should be --starter/generator--
Col. 7, Line 5: "generator" should be --starter/generator--
Col. 7, Line 7: "generator" should be --starter/generator--
Col. 7, Line 40: "generator" should be --starter/generator--
Col. 7, Line 43: "generators" should be --starter/generators--
Col. 7, Line 44: "generators" should be --starter/generators--
Col. 7, Line 45: "generators" should be --starter/generators--
Col. 7, Line 51: "generators" should be --starter/generators--
Col. 7, Line 58: "generators" should be --starter/generators--
Col. 7, Line 61: "generators" should be --starter/generators--
Col. 7, Line 64: "generators" should be --starter/generators--
Col. 7, Line 66: "generator" should be --starter/generator--
Col. 8, Line 4: "generator" should be --starter/generator--
Col. 8, Line 30: "generator" should be --starter/generator--
Col. 8, Line 33: "generators" should be --starter/generators--
Col. 8, Line 34: "generators" should be --starter/generators--
Col. 8, Line 60: "generator" should be --starter/generator--
Col. 9, Line 8: "generator" should be --starter/generator--
Col. 9, Line 11: "generators" should be --starter/generators--
Col. 9, Line 20: "generators" should be --starter/generators--
Col. 9, Line 21: "generators" should be --starter/generators--
Col. 9, Lines 23-24: "generators" should be --starter/generators--
Col. 9, Line 27: "generator" should be --starter/generator--
Col. 9, Line 29: "generator" should be --starter/generator--
Col. 9, Lines 34-35: "generator" should be --starter/generator--
Col. 10, Line 2: "generator" should be --starter/generator--
Col. 10, Lines 21-22: "generator" should be --starter/generator--
Col. 10, Line 27: "generators" should be --starter/generators--

UNITED STATES PATENT AND TRADEMARK OFFICE
CERTIFICATE OF CORRECTION

PATENT NO. : 7,405,542 B1
APPLICATION NO. : 11/613673
DATED : July 29, 2008
INVENTOR(S) : Michael B. McAvoy It is certified that error appears in the above-identified patent and that said Letters Patent is hereby corrected as shown below:

Col. 10, Line 28: "generators" should be --starter/generators--
Col. 10, Line 30: "generators" should be --starter/generators--

Signed and Sealed this

Twenty-fourth Day of March, 2009

JOHN DOLL
*Acting Director of the United States Patent and Trademark Office*